United States Patent Office 3,567,612
Patented Mar. 2, 1971

3,567,612
ELECTROLYTIC COATING OF N - 3 - OXOHY-DROCARBON-SUBSTITUTED ACRYLAMIDE POLYMER
Andrew G. Tsuk, Laurel, Md., assignor to W. R. Grace & Co., New York, N.Y.
No Drawing. Filed Oct. 26, 1967, Ser. No. 678,195
The portion of the term of the patent subsequent to Mar. 25, 1986, has been disclaimed
Int. Cl. B01k 5/02; C23b 13/00
U.S. Cl. 204—181
16 Claims

ABSTRACT OF THE DISCLOSURE

A process for coating metallic electrodes comprising contacting said electrodes with an aqueous acidic solution of an N-3-oxohydrocarbon-substituted acrylamide under ambient conditions by an electrolysis process employing alternating current thereby forming an N-3-oxohydrocarbon-substituted acrylamide polymer coating on the electrodes.

---

Polymerization by electrolysis is well known in the art. However, the polymer-formed by such a process is generally formed in solution and not as a coating on the electrode.

It has recently been discovered that diacetone acrylamide polymer can be coated on a cathode by an electrolysis process employing a source of D.C. voltage from a solution of the monomer. See U.S. Ser. No. 575,259, filed Aug. 26, 1966, now U.S. Pat. No. 3,434,946 and assigned to the same assignee. Such a system is limited commercially to only one article being coated at a time. Additionally, in general, one must convert to D.C. voltage from A.C. voltage making the process less economical. Furthermore, D.C. voltage has a tendency to polarize electrodes and preferably requires the use of a compartmented cell to inhibit the flow of electrolysis products.

One object of the instant invention is to form a N-3-oxohydrocarbon-substituted acrylamide polymer coating on the electrode surfaces of an electrolytic cell. Other objects will be obvious from a reading hereinafter.

In summary, the invention consists of a process for forming a polymeric coating on the electrodes in an electrolytic cell which comprises maintaining an alternating electric potential between said electrodes immersed in an aqueous acidic solution of monomeric N-3-oxohydrocarbon-substituted acrylamide having the structural formula:

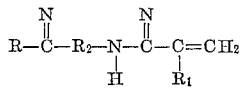

wherein R and $R_1$ are each selected from the class consisting of hydrogen and lower alkyl radicals and $R_2$ is selected from the class consisting of ethylene and a lower alkyl substituted ethylene radical and copolymers thereof under ambient conditions and recovering N-3-oxohydrocarbon-substituted acrylamide polymer as a coating on the electrodes.

The lower alkyl radicals in the acrylamide are those containing not more than about 10 carbon atoms and include also the cycloalkyl radicals. They are exemplified by methyl, ethyl, propyl, isopropyl, butyl, sec-butyl, n-pentyl, cyclohexyl, cyclopentyl, isooctyl, n-decyl, and 4-ethyl-2-hexyl radicals.

The radical $R_2$ is ethylene or an ethylene radical having at least one lower alkyl substituent on the carbon atom which is attached directly to the nitrogen atom of the acrylamide. For purposes of convenient reference, the two carbon atoms of the principal chain of the ethylene radical are designated numerically beginning from the nitrogen atom; i.e., the carbon atom attached directly to the nitrogen atom is designated as atom number 1 and the other as atom number 2. Thus, the $R_2$ radicals are illustrated by ethylene, 1-methyl ethylene, 1,1-dimethyl ethylene, 1,1,2-trimethyl ethylene, 1-methyl-1-ethyl ethylene, 1-methyl-1-isobutyl ethylene, 1-ethyl-1-isopropyl ethylene, 1,1-diisopropyl ethylene, 1,2-dimethyl ethylene, 1-n-butyl-1-n-pentyl ethylene, 1-methyl-1-cyclohexyl ethylene, etc.

The radical $R_1$ is preferably a hydrogen radical. In some instances it may be a lower alkyl radical such as illustrated previously.

Specific examples of the N-3-oxohydrocarbon-substituted acrylamides include but are not limited to, N-3-oxopropyl acrylamide,
N-3-oxobutyl acrylamide,
N-3-oxo-1-methyl-butyl acrylamide,
N-3-oxo-1,1-dimethyl-butyl acrylamide,
N-3-oxo-1-methyl-1,3-dicyclohexyl-propyl acrylamide,
N-3-oxo-1,2-dimethyl-1-ethyl-butyl acrylamide,
N-3-oxo-1,5-dimethyl-1-isopropyl-hexyl acrylamide,
N-3-oxo-1,1-diisobutyl-2-isopropyl-5-methyl-hexyl acrylamide,
N-3-oxo-1,1-dibutyl-2-n-propyl-heptyl acrylamide,
N-3-oxo-1-methyl-butyl-alpha-methyl acrylamide, etc.

Additionally ethylenically unsaturated monomers including diethylenically unsaturated monomers in amounts up to 10% by weight of the N-3-oxohydrocarbon-substituted acrylamide monomer can be copolymerized as a coating on the electrodes by the process of the instant invention. For example, n'n-methylenebisacrylamide, a diethylenically unsaturated monomer, will copolymerize with and crosslink the N-3-oxohydrocarbon-substituted acrylamide of this invention.

Although all of the N-3-oxohydrocarbon-substituted acrylamides taught above have been found operable in the instant invention, for purposes of clarity, N-3-oxo-1,1-dimethyl-butyl acrylamide of the formula:

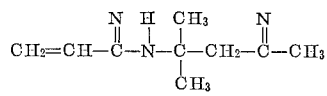

also referred to herein as diacetone acrylamide will be referred to in explaining the invention hereinafter. Thus, whenever N-3-oxo-1,1-dimethyl-butyl acrylamide, (diacetone acrylamide) is referred to herein, it includes all of the N-3-oxohydrocarbon-substituted acrylamides within the structural formula set out supra.

The amount of N-3-oxohydrocarbon-substituted acrylamide monomer dissolved in the electrolytic aqueous bath is an amount sufficient to give a 0.001 to 10 molar solution, preferably 0.5 to 2.0 molar solution. The monomers used in the instant invention are water soluble and also soluble in most organic solvents. However, homopolymers formed therefrom are water insoluble.

In the instant invention the electrolytic apparatus can be any type compartmented cell or standard non-compartmented cell employing a source of A.C. voltage.

The electrodes can be the same or different metals. When different metals are used for the electrodes, the quantity of polymer coating on each electrode is dependent upon the combined effect of the electromotive force of these two metals with respect to the solution and the applied voltage.

Any type of metallic electrodes are operable in the instant invention including, but not limited to, steel, alloyed, steel, Pt, Cd, Sn, Pb, V, Cr, Ti, W, Au, Bi, Ni, Al, Fe, Cu and Zn. It is obvious to one skilled in the art that care should be exercised in selecting the electrodes especially when a high concentration of an acidic electrolyte is used, that the electrodes are not dissolved therein.

Eelectrolytes which are operable in the instant invention include all soluble acids, bases and salts preferably acids and salts. The amount of electrolyte added is usually sufficient to give a 0.001 to 0.5 normal solution.

The coating reaction is carried out in an aqueous acidic solution of the monomer having a pH in the range 1.0 to 6.0. The pH can be adjusted by the use of conventional mineral acids such as sulfuric acid, nitric acid and hydrochloric acid and other mineral acids well known to those skilled in the art.

The coating process of the instant invention is usually performed at temperatures in the range 0 to 60°, preferably room temperature, i.e. 20 to 30° C.

The coating reaction can be carried out for varying periods of time ranging from 5 seconds to 5 hours.

During the electrolysis, a root mean square (RMS) potential difference in the range 1.0–150 volts, preferably 1.5 to 30 volts is maintained between the electrodes as determined by commercial A.C. voltmeters.

It is also possible in practicing the instant invention to add a water soluble hydrogen-substituted peroxide to the aqueous electrolytic solution to increase the reaction rate and improve the binding of the polymer to the metal electrodes. Peroxides such as hydrogen peroxide, t-butyl hydroperoxide are operable in the instant invention. The peroxide, if employed, is added in an amount in the range 0.01 to 1.0% by weight of the aqueous electrolytic monomer solution.

Due to availability, the alternating current source was 110 v., 60 cycle line voltage reduced to the desired potential by means of a potentiometer.

In practicing the instant invention it has been found that optimum adhesion is obtained when the surfaces of the electrodes are freed from grease and rust by washing in a soap solution followed by slight roughening and then an acid wash.

The following examples will aid in explaining but will in no way limit the instant invention. Unless otherwise specified all parts and percentages are by weight. Additionally, the electrodes unless otherwise specified was always immersed in the monomer solution so that the area coated was 25.8 cm.², i.e. a strip 2.5 x 5 cm.

EXAMPLE 1

To a 1000 ml. beaker was charged 400 ml. of a 0.5 molar diacetone acrylamide monomer solution along with 3 ml. of a 30% hydrogen peroxide solution and 7 ml. of 0.3 molar n'n-methylenebisacrylamide (a copolymerizable crosslinking agent). The solution had a pH in the range 3–5. 25.8 cm.² of each of two weighted iron electrodes were immersed in the solution. Argon was bubbled through the solution to maintain an inert atmosphere and a root mean square (RMS) potential difference of 7 volts was maintained across the electrodes. The electrolysis was carried out at room temperature for 2 hours. The voltage was shut off and the coated electrodes removed and oven dried. On inspection the electrodes both had a uniform coating of diacetone acrylamide polymer.

EXAMPLE 2

The electrolyte, consisting of an aqueous solution of 1.0 M diacetone acrylamide monomer, 0.1 $NH_2SO_4$ and 0.001 M $Fe_2(SO_4)_3$ was charged to a cell. Iron electrodes were sanded with silicon paper and acid treated for 2 minutes in a 5% HF solution, weighed and then 25.8 cm.² of each electrode was immersed in the electrolyte. An alternating current of 1.0 volt was applied to the electrodes for 6 hours followed by the application of 2.0 volts for 17 hours, all at room temperature i.e. 25° C. The voltage was shut off and the electrodes removed and dried. On reweighing, one electrode had a uniform coating weighing 0.5 g. and the other had a uniform coating weighing 0.2 g.

EXAMPLE 3

The electrolyte was the same as in Example 2. Aluminum electrodes which had been sanded with silicon paper and acid treated for 2 minutes in a 5% HF solution were each immersed in the electrolyte to cover an area of 25.8 cm.². An alternating current with an electromotive force of 2 volts was applied to the electrodes for 3 hours. On removal, drying and inspection a uniform coating of diacetone acrylamide polymer was observed on each electrode.

EXAMPLE 4

Example 2 was repeated except that a voltage of 10 volts was applied to the electrodes for one hour. A polymeric coating of diacetone acrylamide resulted on each electrode.

On repeating Example 4, with the voltage applied for a 2 hour period, a heavier coating was observed on each electrode.

The coating process of this invention is useful in coating various metals to protect them from abrasion, corrosion and oxidation. Thus, it is possible to coat cans used in the food and beverage industries and other metal objects.

What is claimed is:

1. In the process for forming a polymeric coating under ambient conditions on the cathodic surface of an electrolytic cell from an aqueous solution of monomeric N-3-oxohydrocarbon-substituted acrylamide having the structural formula:

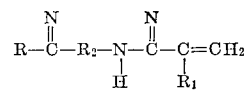

wherein R and $R_1$ are each selected from the class consisting of hydrogen and lower alkyl radicals and $R_2$ is selected from the class consisting of ethylene and a lower alkyl-substituted ethylene radical which comprises maintaining a direct current electric potential between electrodes immersed in an aqueous solution of said monomer, said solution having a pH in the range of 1–6.0, the improvement whereby the polymeric coating is formed on both electrodes which comprises employing an alternating current electric potential in the range 1.0 to 150 volts between the electrodes.

2. The process according to claim 1 wherein the amount of monomer dissolved in the aqueous bath is an amount sufficient to give a 0.001 to 10 molar solution.

3. The process according to claim 1 wherein the coating process is performed at a temperature in the range 0 to 60° C.

4. The process according to claim 1 wherein the monomer is diacetone acrylamide.

5. The process according to claim 1 wherein 0.01 to 1.0 percent by weight of the aqueous solution of an aqueous soluble hydroperoxide is added to the solution.

6. The process according to claim 5 wherein the hydroperoxide is hydrogen peroxide.

7. The process according to claim 1 wherein up to 10% by weight of the N-3-oxohydrocarbon-substituted acrylamide monomer of an ethylenically unsaturated monomer is added to the solution.

8. The process according to claim 7 wherein the ethylenically unsaturated-monomer is n'n-methylenebisacrylamide.

9. The process for forming a polymeric coating under ambient conditions on the electrodes of an electrolytic cell from an aqueous solution of monomeric N-3-oxohydrocarbon-substituted acrylamide having the structural formula:

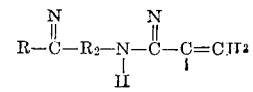

wherein R and $R_1$ are each selected from the class consisting of hydrogen and lower alkyl radicals and $R_2$ is selected from the class consisting of ethylene and a lower alkyl-substituted ethylene radical which comprises maintaining an alternating current electric potential in the range 1.0–150 volts between said electrodes immersed in an aqueous solution of said monomer, said solution having a pH in the range 1–6.0, and recovering a polymer of N-3-oxohydrocarbon-substituted acrylamide as a coating on said electrodes.

10. The process according to claim 9 wherein the amount of monomer dissolved in the aqueous bath is an amount sufficient to give a 0.001 to 10 molar solution.

11. The process according to claim 9 wherein the coating process is performed at a temperature in the range 0 to 60° C.

12. The process according to claim 9 wherein the monomer is diacetone acrylamide.

13. The process according to claim 9 wherein 0.01 to 1.0 percent by weight of the aqueous solution of an aqueous soluble hydroperoxide is added to the solution.

14. The process according to claim 13 wherein the hydroperoxide is hydrogen peroxide.

15. The process according to claim 9 wherein up to 10% by weight of the N-3-oxohydrocarbon-substituted acrylamide monomer of an ethylenically unsaturated monomer is added to the solution.

16. The process according to claim 9 wherein the ethylenically unsaturated-monomer is n'n-methylenebisacrylamide.

References Cited

UNITED STATES PATENTS

| 3,200,058 | 8/1965 | Oster | 204—181 |
| 3,434,946 | 3/1969 | Ehrig et al. | 204—72 |
| 3,392,101 | 7/1968 | Barrett et al. | 204—181 |

HOWARD S. WILLIAMS, Primary Examiner

PO-1050
(5/69)

UNITED STATES PATENT OFFICE
CERTIFICATE OF CORRECTION

Patent No. 3,567,612                    Dated March 2, 1971

Inventor(s) Andrew G. Tsuk

It is certified that error appears in the above-identified patent and that said Letters Patent are hereby corrected as shown below:

In column 1, lines 50-53, the structural formula should read follows:

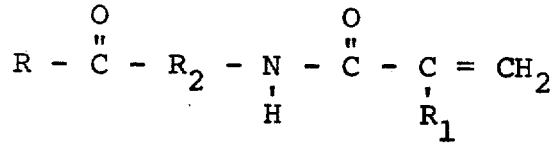

In column 2, lines 40-43, the structural formula should read follows:

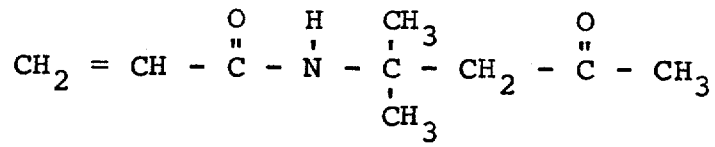

In column 4, claim 1, lines 30-33, the structural formula sh read as follows:

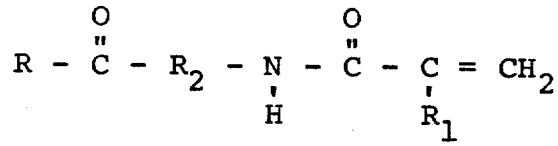

In column 4, claim 9, lines 71-74, the structural formula sh read as follows:

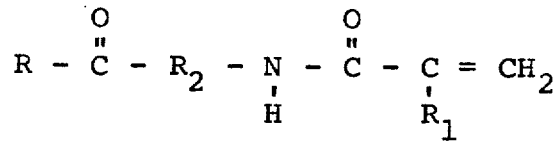

Signed and sealed this 7th day of September 1971.

(SEAL)
Attest:

EDWARD M. FLETCHER, JR.                ROBERT GOTTSCHALK
Attesting Officer                       Acting Commissioner of Paten